US012243678B2

(12) United States Patent
Kotani et al.

(10) Patent No.: US 12,243,678 B2
(45) Date of Patent: Mar. 4, 2025

(54) LEAKAGE TRANSFORMER

(71) Applicant: Panasonic Intellectual Property Management Co., Ltd., Osaka (JP)

(72) Inventors: Junichi Kotani, Hyogo (JP); Osamu Moriya, Nara (JP); Hisayoshi Kato, Osaka (JP); Toshiyuki Asahi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 692 days.

(21) Appl. No.: 17/441,437

(22) PCT Filed: Mar. 13, 2020

(86) PCT No.: PCT/JP2020/011271
§ 371 (c)(1),
(2) Date: Sep. 21, 2021

(87) PCT Pub. No.: WO2020/203197
PCT Pub. Date: Oct. 8, 2020

(65) Prior Publication Data

US 2022/0189687 A1 Jun. 16, 2022

(30) Foreign Application Priority Data

Mar. 29, 2019 (JP) ................................ 2019-069213

(51) Int. Cl.
*H01F 5/00* (2006.01)
*H01F 27/26* (2006.01)
(Continued)

(52) U.S. Cl.
CPC ............. *H01F 38/08* (2013.01); *H01F 27/26* (2013.01); *H01F 27/2804* (2013.01); *H01F 2027/2809* (2013.01)

(58) Field of Classification Search
CPC .................................................. H01F 27/2804
(Continued)

(56) References Cited

U.S. PATENT DOCUMENTS 2,914,721 A * 11/1959 Kohn ........................ G05F 3/06 336/155
5,485,362 A * 1/1996 Archer ................ H02M 3/3372 363/24
(Continued)

FOREIGN PATENT DOCUMENTS

JP 2002-057045 A 2/2002
JP 2014-063856 A 4/2014
(Continued)

OTHER PUBLICATIONS

International Search Report and Written Opinion issued in International Patent Application No. PCT/JP2020/011271 dated Jun. 16, 2020; with partial English translation.

*Primary Examiner* — Ronald Hinson
(74) *Attorney, Agent, or Firm* — Rimon P.C.

(57) ABSTRACT

A leakage transformer includes a core and a printed wiring board. The core includes a first magnetic leg and a second magnetic leg. The second magnetic leg is spaced from the first magnetic leg. The printed wiring board includes an insulating portion and conductor wiring. The conductor wiring includes a first coil and a second coil. The first coil is formed of a first winding and is wound around only the first magnetic leg, not around the second magnetic leg. The second coil is formed of a second winding and includes a first part and a second part. The first part is wound around only the first magnetic leg, not around the second magnetic leg. The second part is wound around both the first and second magnetic legs.

5 Claims, 12 Drawing Sheets

(51) Int. Cl.
*H01F 27/28* (2006.01)
*H01F 38/08* (2006.01)

(58) Field of Classification Search
USPC .......................................................... 336/200
See application file for complete search history.

(56) References Cited

U.S. PATENT DOCUMENTS

| | | | | |
|---|---|---|---|---|
| 7,956,491 | B2 * | 6/2011 | Ochi ....................... | H01F 27/38 307/17 |
| 10,930,423 | B1 * | 2/2021 | Folker ................. | H01F 41/0206 |
| 11,101,063 | B2 * | 8/2021 | Scholz .................... | H01F 27/06 |
| 2007/0047266 | A1 * | 3/2007 | Nakahori ................ | H02M 3/28 363/17 |
| 2018/0174730 | A1 * | 6/2018 | Scholz ............... | H01R 13/7195 |
| 2018/0240588 | A1 | 8/2018 | Nagaoka et al. | |
| 2018/0350513 | A1 * | 12/2018 | Murakami ............. | H01F 37/00 |

FOREIGN PATENT DOCUMENTS

| | | | |
|---|---|---|---|
| JP | 2017-147321 | A | 8/2017 |
| WO | 2017/061329 | A1 | 4/2017 |

* cited by examiner

LEAKAGE TRANSFORMER

CROSS-REFERENCE OF RELATED APPLICATIONS

This application is the U.S. National Phase under 35 U.S.C. § 371 of International Patent Application No. PCT/JP2020/011271, filed on Mar. 13, 2020, which in turn claims the benefit of Japanese Application No. 2019-069213, filed on Mar. 29, 2019, the entire disclosures of which Applications are incorporated by reference herein.

TECHNICAL FIELD

The present disclosure relates to a leakage transformer.

BACKGROUND ART

Patent Literature 1 discloses a transformer including a core with a middle leg and side legs, a primary winding wound around each of the middle leg and the side legs, and a secondary winding wound around the side legs.

However, in Patent Literature 1, the primary winding is wound around each of the middle leg and the side legs, which tends to make the winding long. As the winding increases its length, electrical resistance and power loss tend to increase proportionally to the length of the winding.

CITATION LIST

Patent Literature

Patent Literature 1: WO 2017/061329 A1

SUMMARY OF INVENTION

It is therefore an object of the present disclosure is to provide a leakage transformer with the ability to reduce the chances of causing an increase in electrical resistance and power loss, which arises when leakage inductance is allowed to be produced.

A leakage transformer according to an aspect of the present disclosure includes a core and a printed wiring board. The core includes a first magnetic leg and a second magnetic leg. The second magnetic leg is arranged to be spaced from the first magnetic leg. The printed wiring board includes an insulating portion and conductor wiring. The conductor wiring includes a first coil and a second coil. The first coil is formed of a first winding. The first coil is wound around the first magnetic leg but not wound around the second magnetic leg. The second coil is formed of a second winding. The second coil includes a first part and a second part. The first part is wound around the first magnetic leg but not wound around the second magnetic leg. The second part is wound around both the first magnetic leg and the second magnetic leg.

DESCRIPTION OF EMBODIMENTS

First, it will be described how and why the present inventors conceived the basic idea of the present disclosure.

In a leakage transformer such as the one disclosed in Patent Literature 1, a winding is wound around each of the middle leg and the side legs. In addition, in the leakage transformer, the winding is wound around the side legs in a direction opposite to a direction in which the winding is wound around the middle leg. In addition, besides the middle leg and the side legs, other legs, around which no winding is wound, are provided for the core. In the leakage transformer, the magnetic flux is allowed to leak to these other legs, thereby adjusting the leakage inductance produced within the core.

As a result of extensive research, the present inventors discovered that when wound around each of the middle leg and the side legs, the winding of the leakage transformer tended to have an increased length. In addition, the present inventors also discovered that electrical resistance and power loss increased with the increase in the length of the winding.

In view of these discoveries, the present inventors conceived the basic idea of the present disclosure that would contribute effectively to reducing electrical resistance and power loss by shortening the length of the winding.

First Embodiment

Next, an overview of a leakage transformer 1 according to a first embodiment will be described.

Figure 1:
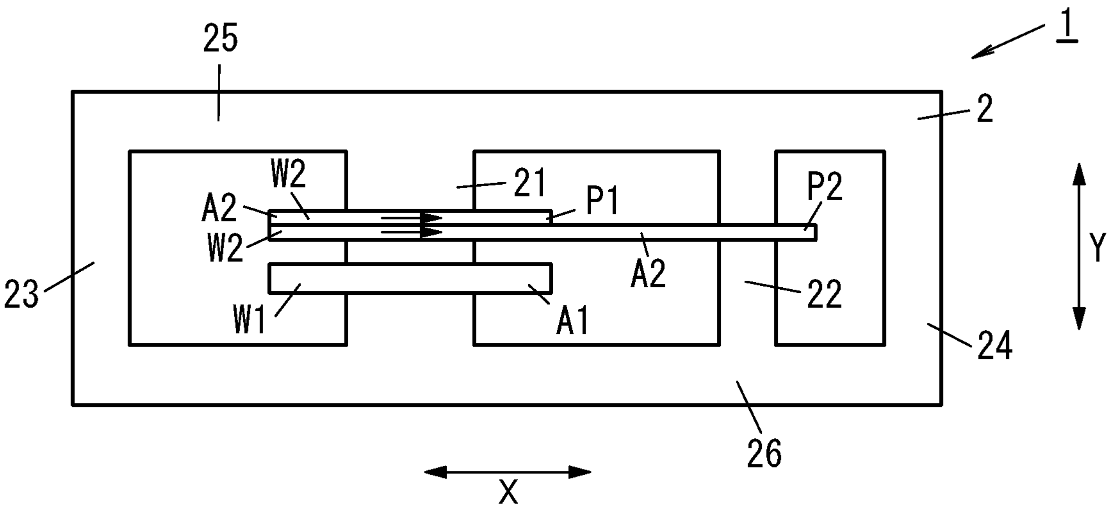
FIG. 1 is a schematic representation of a leakage transformer according to a first embodiment.

FIG. 1 is a schematic representation, in which illustration of a printed circuit board 5 is omitted for the sake of simplicity of description, even though the leakage transformer 1 according to this embodiment actually includes the printed circuit board 5 as shown in FIGS. 2-5. As shown in FIG. 1, the leakage transformer 1 according to this embodiment includes a core 2, a first coil W1, and a second coil W2. The core 2 includes a first magnetic leg 21 and a second magnetic leg 22. The second magnetic leg 22 is arranged to be spaced from the first magnetic leg 21. The first coil W1 is formed of a first winding A1. The first coil W1 is wound around the first magnetic leg 21 but not wound around the second magnetic leg 22. The second coil W2 is formed of a second winding A2. The second coil W2 includes a first part P1 and a second part P2. The first part P1 is wound around the first magnetic leg 21 but not wound around the second magnetic leg 22. The second part P2 is wound around both the first magnetic leg 21 and the second magnetic leg 22.

In such a leakage transformer 1, the second part P2 formed of the second winding A2 is wound around both the first magnetic leg 21 and the second magnetic leg 22, and therefore, the length of the second winding A2 used as the second coil W2 may be shortened. In other words, compared to a situation where the second winding A2 is wound around each of the first magnetic leg 21 and the second magnetic leg 22, a portion where the second winding A2 passes through a space between the first magnetic leg 21 and the second magnetic leg 22 may be omitted from the second part P2. Thus, the length of the second winding A2 used as the second coil W2 may be shortened, and therefore, the electrical resistance and power loss caused by the second coil W2 may be reduced.

Next, the leakage transformer 1 according to this embodiment will be described in detail with reference to FIG. 1. FIG. 1 schematically illustrates a relationship between the core 2, the first coil W1, and the second coil W2.

As shown in FIG. 1, the leakage transformer 1 includes the core 2, the first coil W2, and the second coil W2. The core 2 includes the first magnetic leg 21, the second magnetic leg 22, a third magnetic leg 23, a fourth magnetic leg 24, a first connection portion 25, and a second connection portion 26.

As used herein, in the following description of this embodiment, a direction in which the first magnetic leg 21 and the second magnetic leg 22 are arranged side by side is supposed to be an X direction, and a direction perpendicular to the X direction is supposed to be a Y direction as shown in FIG. 1. In this specification, the term "perpendicular to" refers to not only an arrangement in which the X direction and the Y direction are strictly perpendicular to each other but also an arrangement in which the two directions are substantially perpendicular to each other.

As described above, the core 2 includes the first to fourth magnetic legs 21, 22, 23, 24. That is to say, the core 2 includes, in addition to the first and second magnetic legs 21, 22, two more magnetic legs (third and fourth magnetic legs) 23, 24 which are different from the first magnetic leg 21 and the second magnetic leg 22. The first and second magnetic legs 21, 22 are provided between the third magnetic leg 23 and the fourth magnetic leg 24. Moreover, the first to fourth magnetic legs 21, 22, 23, 24 are arranged to be spaced from each other in the X direction (see FIG. 1). The coil is wound around neither of the third magnetic leg 23 nor the fourth magnetic leg 24.

All of the first to fourth magnetic legs 21, 22, 23, 24 are columnar. The cross-sectional shape of each of the first to fourth magnetic legs 21, 22, 23, 24 in the X direction may be arbitrarily selected. Examples of this cross-sectional shape include circular, elliptical, and polygonal shapes such as quadrangular shapes.

As described above, the core 2 includes the first connection portion 25 and the second connection portion 26. The first and second connection portions 25, 26 are arranged one on top of the other, and spaced from each other, in the Y direction. Specifically, the first to fourth magnetic legs 21, 22, 23, 24 are provided between the first and second connection portions 25, 26. The first and second connection portions 25, 26 and the first to fourth magnetic legs 21, 22, 23, 24 are integrated together to form the core 2. In the Y direction, the first connection portion 25 is connected to one end of each of the first to fourth magnetic legs 21, 22, 23, 24, and the second connection portion 26 is connected to the other end of each of the first to fourth magnetic legs 21, 22, 23, 24.

The first coil W1 is wound around the first magnetic leg 21 but not wound around the second magnetic leg 22.

The first part P1 of the second coil W2 is a coil-shaped part that is wound around the first magnetic leg 21 but not wound around the second magnetic leg 22. Note that the number of turns of the second coil W2 with respect to the first magnetic leg 21 is not particularly limited but may be arbitrarily set.

The second part P2 is a part wound around both the first magnetic leg 21 and the second magnetic leg 22. In the second part P2, the second winding A2 does not pass through the space between the first and second magnetic legs 21, 22. This allows shortening, compared to a situation where the second winding A2 is wound individually around each of the first magnetic leg 21 and the second magnetic leg 22, the length of the second winding A2 used as the second coil W2. Therefore, the electrical resistance and power loss of the second coil W2 caused by the second coil W2 may be reduced.

In this embodiment, the winding direction of the second winding A2 with respect to the first part P1 and the winding direction of the second winding A2 with respect to the second part P2 are the same. For this reason, when the leakage transformer 1 is energized, the magnetic flux which is produced by the second part P2 and heads from the second magnetic leg 22 toward the first magnetic leg 21 is canceled by the magnetic flux produced by the first part P1, in the first and second connection portions 25, 26. This reduces the interlinkage magnetic flux produced within the core 2, thereby increasing the chances of reducing the coupling coefficient between the first and second coils W1, W2. As a result, leakage inductance tends to increase.

FIG. 1 shows, an arrangement in which the winding direction of the second winding A2 is counterclockwise with respect to each of the first and second parts P1, P2 when the second coil W2 is viewed from over the first connection portion 25 in the Y direction. Note that in FIG. 1, the winding direction of the second winding A2 with respect to the first part and the winding direction of the second winding A2 with respect to the second part are schematically indicated by the arrows. Nevertheless, as long as the winding directions of the first and second parts P1, P2 are the same, the winding direction of the second winding A2 with respect to the first and second parts P1, P2 may also be clockwise.

The second coil W2 may also include a plurality of first parts P1 and a plurality of second parts P2. In that case, the first parts P1 and the second parts P2 are preferably connected alternately.

As described above, since the core 2 includes the third and fourth magnetic legs 23, 24, the magnetic flux which passes through the first magnetic leg 21 is induced to pass through the third magnetic leg 23 via the first and second connection portions 25, 26. Meanwhile, the magnetic flux which passes through the second magnetic leg 22 is induced to pass through the fourth magnetic leg 24 via the first and second connection portions 25, 26. This reduces the chances of allowing the magnetic flux generated in the leakage transformer 1 to leak out of the core 2.

In addition, in a general leakage transformer, a gap may be provided for the magnetic legs for the purpose of avoiding magnetic saturation. Providing the gap causes an increase in the external leakage of the magnetic flux. To overcome such a problem, in this embodiment, the core 2 preferably has no gaps in any of the first to fourth magnetic legs 21, 22, 23, 24. This reduces the chances of allowing the magnetic flux to leak out of the core 2.

As described above, if the chances of causing the leakage of the magnetic flux out of the core 2 are reduced, noise generation may also be reduced. Specifically, by reducing the chances of causing the leakage of the magnetic flux out of the core 2, the following effect may be achieved. Specifically, this may reduce the magnetic flux interlinking with conductor wiring (e.g., copper wire) which is provided on, for example, a printed wiring board, thereby reducing the chances of allowing the magnetic flux to generate noise from the conductor wiring.

As used herein, the expression “the core 2 has no gap” means that the core has substantially no gap. In general, the core 2 is formed by bonding two members. Therefore, the term “substantially” means allowing the presence of an interface or a narrow air gap between the members which is created while the core 2 is being formed, or an adhesive layer which bonds the two members together.

The core 2 may be made of a metallic magnetic material which transmits magnetic flux and any suitable metallic magnetic material may be used without limitation. Examples of the core using the metallic magnetic material include dust cores.

Next, a specific configuration of the leakage transformer 1 according to the first embodiment will be described with reference to FIGS. 2-6. In the following description, any constituent element of this embodiment, having the same function as a counterpart of the leakage transformer shown in FIG. 1, will be designated, on the drawings, by the same reference numeral as that counterpart's, and a detailed description thereof will be omitted herein.

Figure 2:
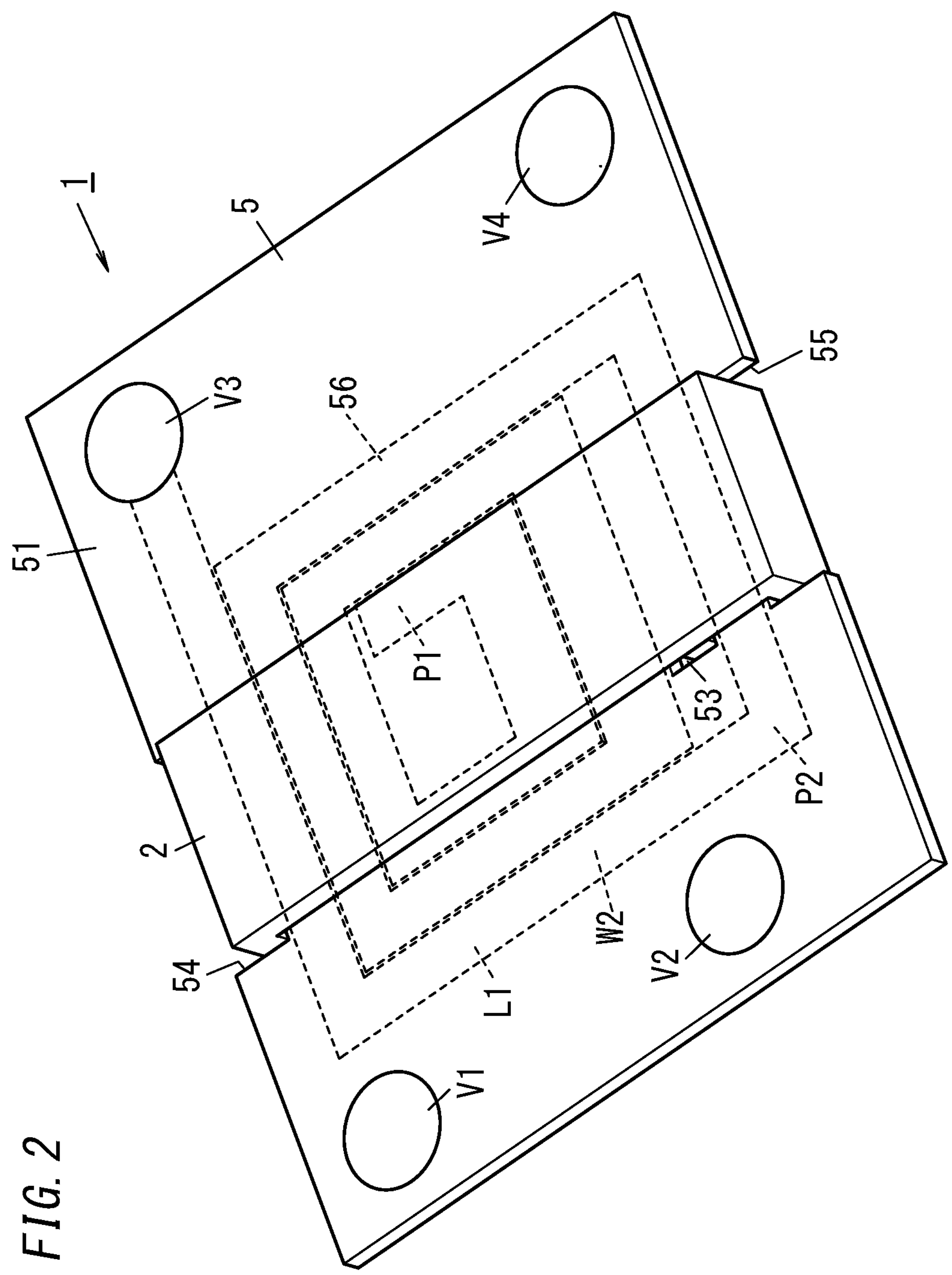
FIG. 2 is a perspective view of the leakage transformer according to the first embodiment.
Figure 3A:
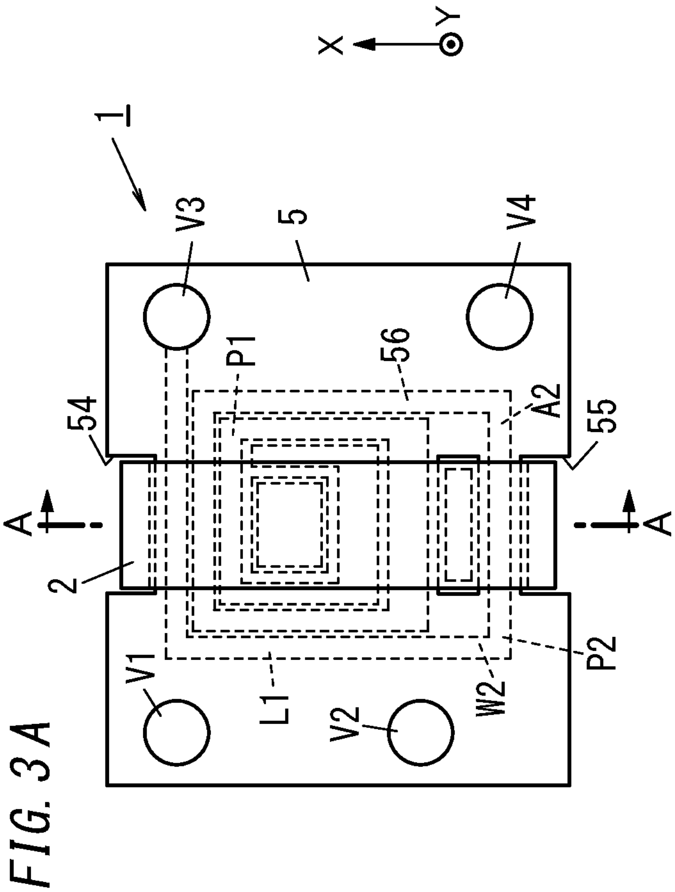
FIG. 3A is a plan view of the leakage transformer as viewed in one direction perpendicular to a direction in which the first magnetic leg and the second magnetic leg are arranged side by side.

As shown in FIGS. 2 and 3A, the leakage transformer 1 according to this embodiment includes the core 2 and a printed wiring board 5.

Figure 3B:
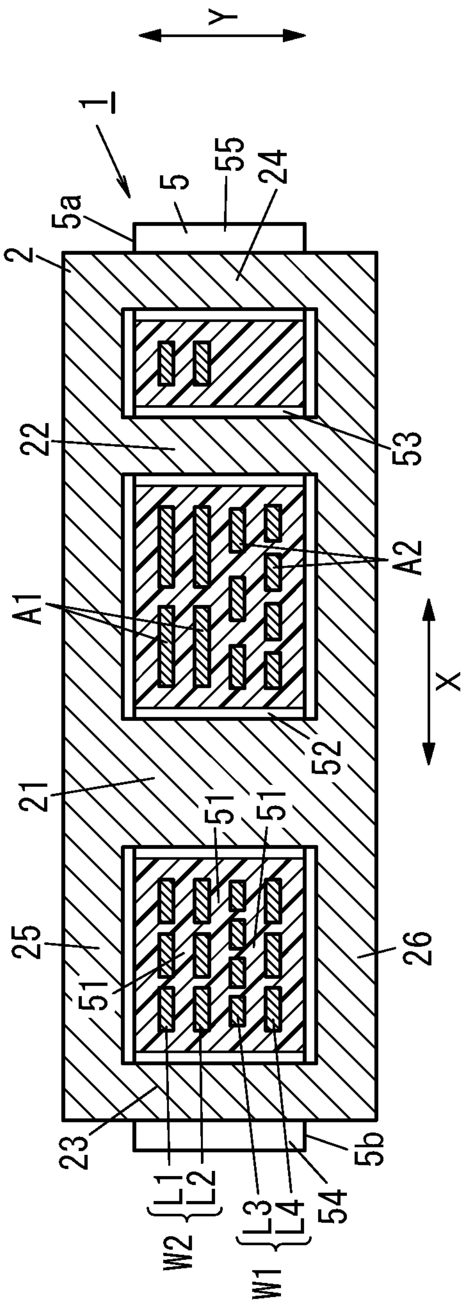
FIG. 3B is a cross-sectional view taken along the plane A-A of FIG. 3A.

As shown in FIG. 3B, the core 2 includes the first magnetic leg 21, the second magnetic leg 22, the third magnetic leg 23, the fourth magnetic leg 24, the first connection portion 25, and the second connection portion 26.

Figure 4:
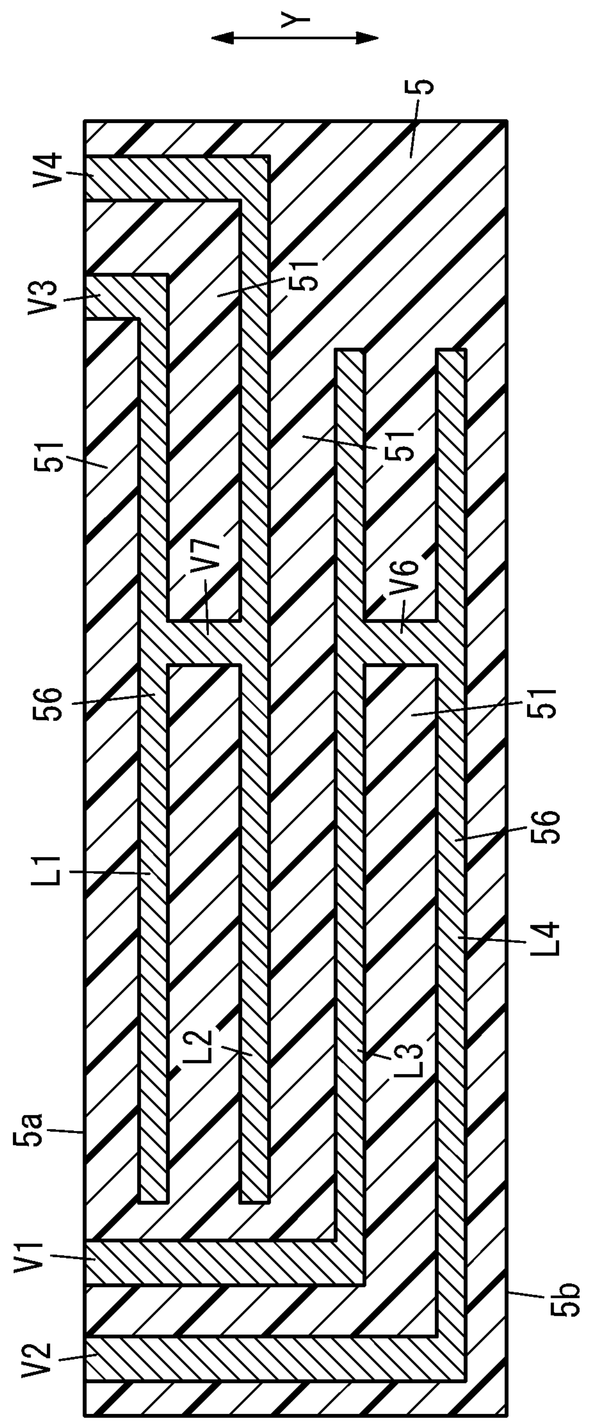
FIG. 4 illustrates the leakage transformer.

As shown in FIG. 3B, the printed wiring board 5 has a first through hole 52 and a second through hole 53. The first through hole 52 is a hole through which the first magnetic leg 21 is passed. The second through hole 53 is a hole through which the second magnetic leg 22 is passed. As shown in FIG. 4, the printed wiring board 5 further includes an insulating portion 51 and conductor wiring 56. Moreover, the printed wiring board 5 has a first surface 5*a* and a second surface 5*b* which are parallel to each other.

The conductor wiring 56 includes a plurality of wiring layers (namely, a first layer L1, a second layer L2, a third layer L3, and a fourth layer L4). The insulating portion 51 includes, for example, a plurality of insulating layers. In the printed wiring board 5, the wiring layers and the insulating layers may be alternately stacked one on top of another.

The conductor wiring 56 includes the first coil W1 and the second coil W2. In the conductor wiring 56, each wiring layer includes at least one of a first wiring part 91 which forms at least a part of the first coil W1 or a second wiring part 92 which forms at least a part of the second coil W2 (see FIGS. 5A-5D).

Figure 5A:
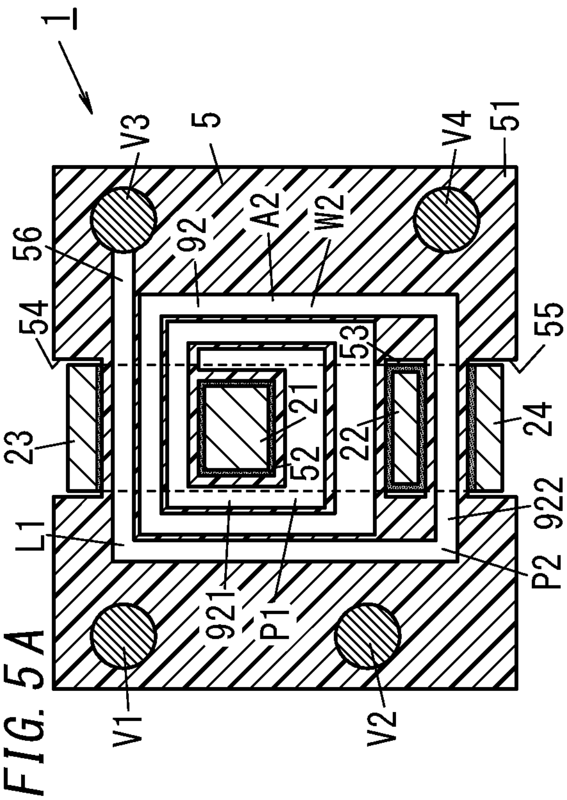
FIGS. 5A-5D illustrate the leakage transformer.
Figure 5B:
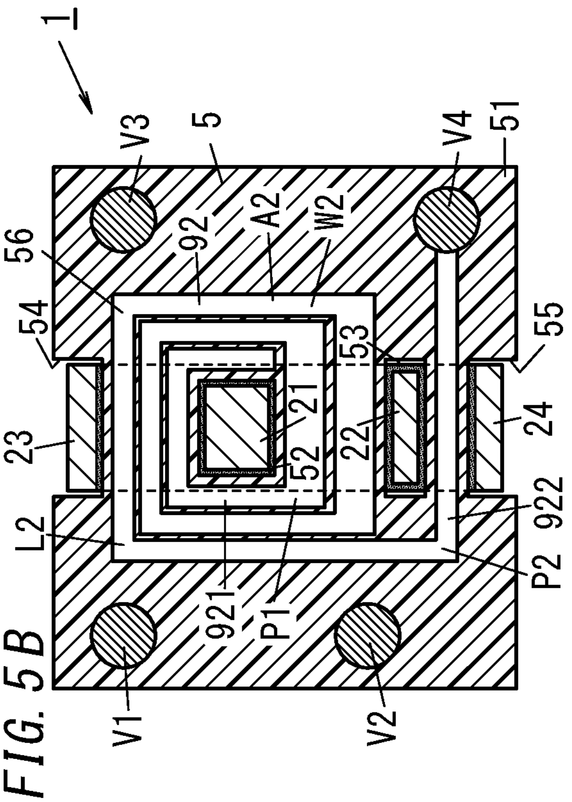

The second wiring part 92 includes at least one of a part 921 which forms at least a part of the first part P1 or a part 922 which forms at least a part of the second part P2 (see FIGS. 5A and 5B).

The part 921 is spirally formed so as to surround only the first through hole 52 out of the first and second through holes 52, 53.

The part 922 is spirally formed so as to surround both of the first and second through holes 52, 53 alike.

Figure 5C:
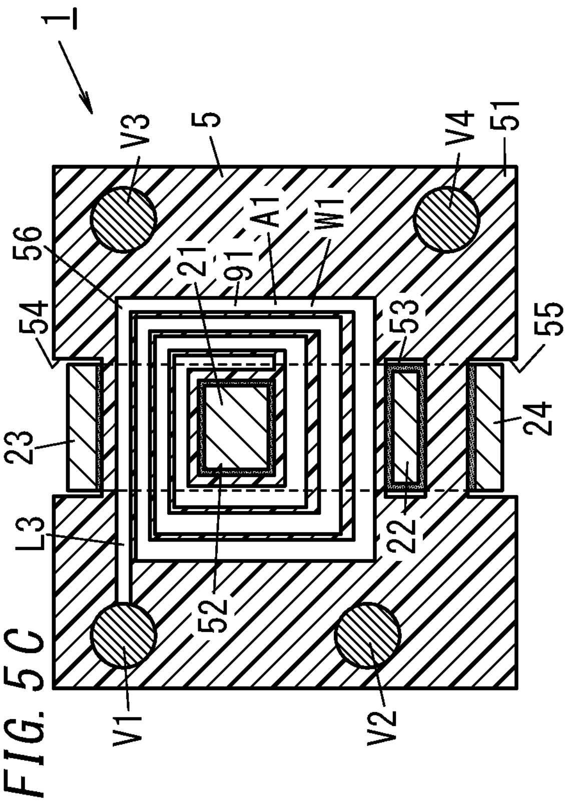
Figure 5D:
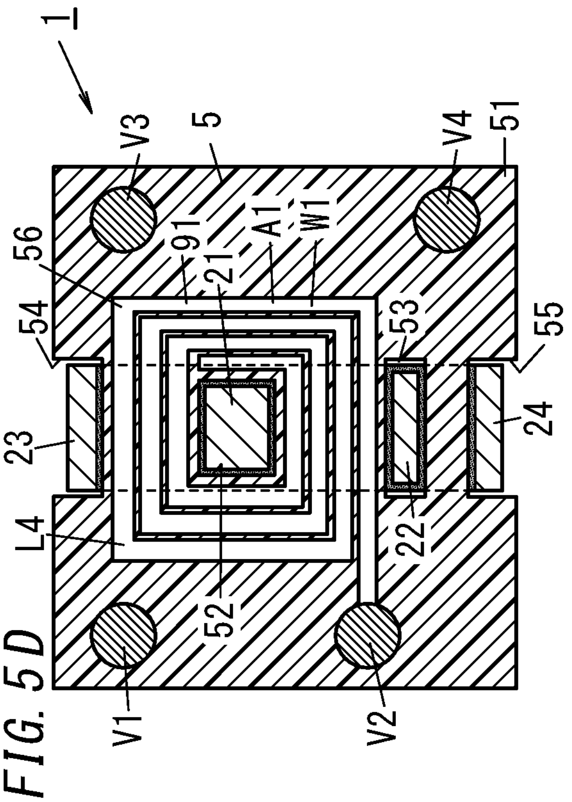

The first wiring part 91 is spirally formed so as to surround only the first through hole 52 out of the first and second through holes 52, 53 (see FIGS. 5C and 5D).

If the conductor wiring 56 includes a plurality of first wiring parts 91, the first coil W1 is formed by electrically connecting the first wiring parts 91 through vias.

Next, the printed wiring board 5 according to this embodiment will be described in detail with reference to FIGS. 4-5B. FIG. 4 is a schematic representation of the printed wiring board 5 and does not show the core 2 to make the connection inside the printed wiring board 5 more easily understandable. Moreover, FIG. 4 is drawn such that a first via V1 and a second via V2 do not overlap with each other and that a third via V3 and a fourth via V4 do not overlap with each other.

The conductor wiring 56 includes the first layer L1, the second layer L2, the third layer L3, the fourth layer L4, the first via V1, the second via V2, the third via V3, the fourth via V4, a via V6, and a via V7.

The printed wiring board 5 as shown in FIG. 4 has a multilayer structure in which the first layer L1, the second layer L2, the third layer L3, and the fourth layer L4 are arranged in this order, in the Y direction, from the first surface 5*a* toward the second surface 5*b*. The first via V1 is connected to the first surface 5*a* and the third layer L3. The second via V2 is connected to the first surface 5*a* and the fourth layer L4. The third via V3 is connected to the first surface 5*a* and the first layer L1. The fourth via V4 is connected to the first surface 5*a* and the second layer L2.

The first layer L1 is connected to the via V7, and this via V7 is connected to the second layer L2. The third layer L3 is connected to the via V6, and this via V6 is connected to the fourth layer L4.

As shown in FIG. 5A, the first layer L1 is a layer including the first part P1 and the second part P2 which is connected to the first part P1 and the third via V3. The first layer L1 is formed of the second winding A2. The first part P1 is a part that is wound around the first magnetic leg 21 but not wound around the second magnetic leg 22. The second part P2 is a part wound around both the first magnetic leg 21 and the second magnetic leg 22. In the second part P2, the second winding A2 passes through the space between the fourth magnetic leg 24 and the second magnetic leg 22 but does not pass through the space between the first and second magnetic legs 21, 22.

As shown in FIG. 5B, the second layer L2 is a layer including the first part P1 and the second part P2 which is connected to the first part P1 and the fourth via V4. The second layer L2 is formed of the second winding A2. The first part P1 is a part that is wound around the first magnetic leg 21 but not wound around the second magnetic leg 22. The second part P2 is a part wound around both the first magnetic leg 21 and the second magnetic leg 22. In the second part P2, the second winding A2 passes through the space between the fourth magnetic leg 24 and the second magnetic leg 22 but does not pass through the space between the first and second magnetic legs 21, 22.

The second winding A2 may be formed out of a sheet of metal foil such as copper foil. Specifically, the second winding A2 is formed by performing an etching process on the sheet of metal foil to remove an unnecessary part thereof when each of the first layer L1 and the second layer L2 is formed.

The second coil W2 is formed by connecting the first layer L1 and the second layer L2 through the via V7.

In the second part P2 of the second coil W2, the second winding A2 does not pass through the space between the first and second magnetic legs 21, 22. This allows shortening the length of the second winding A2 used as the second coil W2. Therefore, the electrical resistance and power loss caused by the second coil W2 may be reduced.

Moreover, as shown in FIGS. 5A and 5B, the winding direction of the second winding A2 with respect to the first part P1 and the winding direction of the second winding A2 with respect to the second part P2 are the same. That is to say, when the second winding A2 is energized, an electric current flows through the first part P1 and the second part P2 in the same direction, when viewed along the axis of the second coil W2. For this reason, when the leakage transformer 1 is energized, the magnetic flux produced by the first magnetic leg 21 is canceled by the magnetic flux produced by the second magnetic leg 22, in the first and second connection portions 25, 26. This reduces the magnetic flux interlinking with the first coil W1, thereby increasing the chances of reducing the coupling coefficient between the first and second coils W1, W2. As a result, leakage inductance tends to increase. Note that in the example shown in FIGS. 5A and 5B, the winding direction of the second winding A2 is counterclockwise with respect to the third via V3, when the printed wiring board 5 is viewed in the Y direction from over the first connection portion 25.

When the first layer L1 and the second layer L2 are connected through the via V7, this via V7 is provided between a tip portion, located most distant in the first layer L1 from the third via V3, of the second winding A2 and a tip portion, located most distant in the second layer L2 from the fourth via V4, of the second winding A2.

As shown in FIG. 5C, the third layer L3 is a layer wound around the first magnetic leg 21 but not wound around the second magnetic leg 22 and is formed of the first winding A1. The third layer L3 is connected to the first via V1.

As shown in FIG. 5D, the fourth layer L4 is a layer wound around the first magnetic leg 21 but not wound around the second magnetic leg 22 and is formed of the first winding A1. The fourth layer L4 is connected to the second via V2.

The first winding A1 is formed out of a sheet of metal foil such as copper foil. Specifically, the first winding A1 is formed by performing an etching process on the sheet of metal foil to remove an unnecessary part thereof when each of the third layer L3 and the fourth layer L4 is formed.

The first coil W1 is formed by connecting the third layer L3 and the fourth layer L4 through the via V6.

When the third layer L3 and the fourth layer L4 are connected through the via V6, this via V6 is provided between a tip portion, located most distant in the third layer L3 from the first via V1, of the first winding A1 and a tip portion, located most distant in the fourth layer L4 from the second via V2, of the first winding A1. Note that in the example shown in FIGS. 5C and 5D, the winding direction of the first winding A1 is clockwise with respect to the first via V1, when the printed wiring board 5 is viewed in the Y direction from over the first connection portion 25.

As described above, the printed wiring board 5 includes the insulating portion 51. As shown in FIG. 4, the insulating portion 51 covers the first to fourth layers L1, L2, L3, L4, the first to fourth vias V1, V2, V3, V4, the via V6, and the via V7. In particular, the insulating portion 51 is interposed between the second layer L2 and the third layer L3. Therefore, the first and second layers L1, L2 are insulated from the third and fourth layers L3, L4 by the insulating portion 51. Note that each of the first to fourth vias V1, V2, V3, V4 may be partially exposed on the first surface 5*a*.

The insulating portion 51 is made of a material having electrical insulation properties. This material is an arbitrary compound which may be used to fabricate the printed wiring board. Examples of the material having electrical insulation properties include epoxy resins.

In this embodiment, the first coil W1 and the second coil W2 may each have its shape easily stabilized when formed as the conductor wiring 56. This allows reducing, even when a great many leakage transformers 1 are manufactured, dispersion in leakage inductance between the individual products.

As shown in FIG. 3B, the printed wiring board 5 further has the first through hole 52 and the second through hole 53.

The first through hole 52 is a hole which penetrates in the Y direction through the printed wiring board 5. The first magnetic leg 21 is inserted into this first through hole 52.

The second through hole 53 is a hole which penetrates in the Y direction through the printed wiring board 5. The second magnetic leg 22 is inserted into this second through hole 53.

As shown in FIG. 3A, the printed wiring board 5 further includes a first groove portion 54 and a second groove portion 55. The first groove portion 54 is a groove-shaped portion extending in the Y direction and is provided at a position corresponding to the third magnetic leg 23. The second groove portion 55 is a groove-shaped portion extending in the Y direction and is provided at a position corresponding to the fourth magnetic leg 24.

To fabricate the printed wiring board 5 according to this embodiment, an arbitrary method for fabricating a multilayer printed wiring board may be adopted.

As described above, the core 2 includes the first magnetic leg 21, the second magnetic leg 22, the third magnetic leg 23, and the fourth magnetic leg 24. Each of the first to fourth magnetic legs 21, 22, 23, 24 has a quadrangular cross section in the examples shown in FIGS. 5A-5D. However, this is only an example and should not be construed as limiting. Alternative examples of the cross-sectional shapes of the first to fourth magnetic legs 21, 22, 23, 24 include circular, elliptical, and polygonal shapes.

Figure 6:
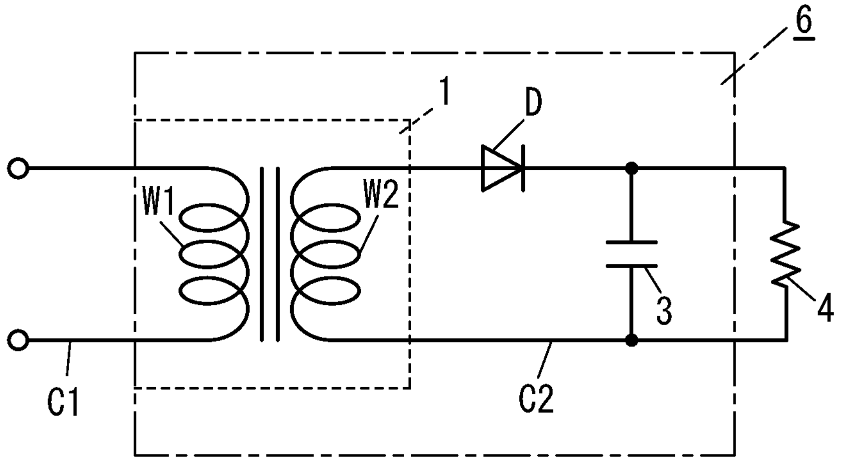
FIG. 6 is a circuit diagram of a circuit including the leakage transformer.

The leakage transformer 1 according to this embodiment may be connected, for example, as shown in FIG. 6.

A power supply circuit section 6 includes the leakage transformer 1, a diode D, and a capacitor 3 (see FIG. 6). In the power supply circuit section 6 of this embodiment, a primary circuit C1 is connected to the first coil W1 and a secondary circuit C2 is connected to the second coil W2. Of the primary circuit C1 and the secondary circuit C2, electric power is supplied to the primary circuit C1. Meanwhile, the secondary circuit C2 is electrically connected to a load 4.

The power supply circuit section 6 may be used as a switching power supply which uses an FET (Field Effect Transistor). This allows supplying electric power to the primary circuit C1 to obtain desired output power.

Second Embodiment

Next, a leakage transformer 1 according to a second embodiment will be described with reference to FIGS. 7-12. In the following description, any constituent element of this second embodiment, having the same function as a counterpart of the first embodiment described above, will be designated, on the drawings, by the same reference numeral as that counterpart's, and a detailed description thereof will be omitted herein.

Figure 7:
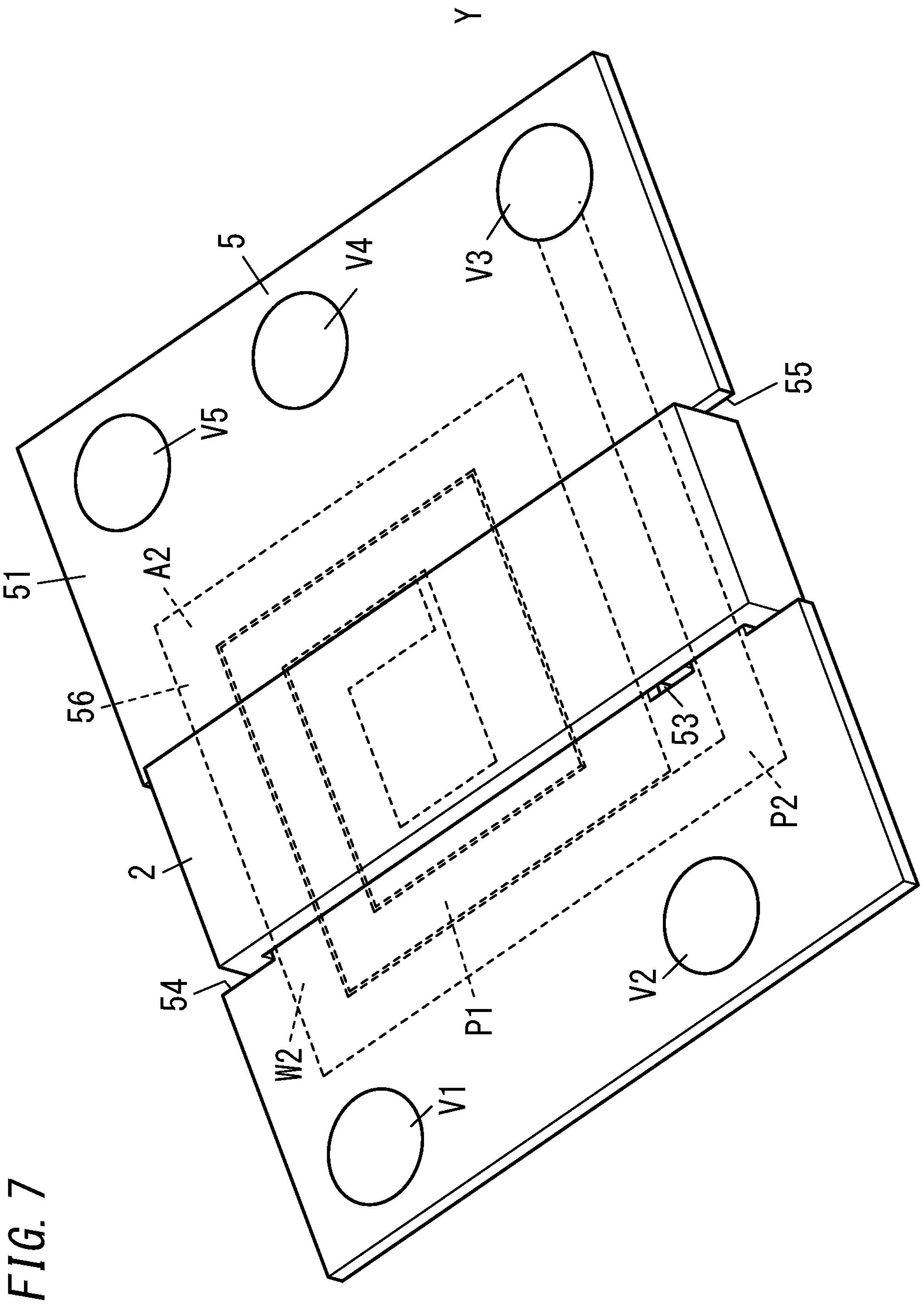
FIG. 7 is a perspective view of a leakage transformer according to a second embodiment.
Figure 8A:
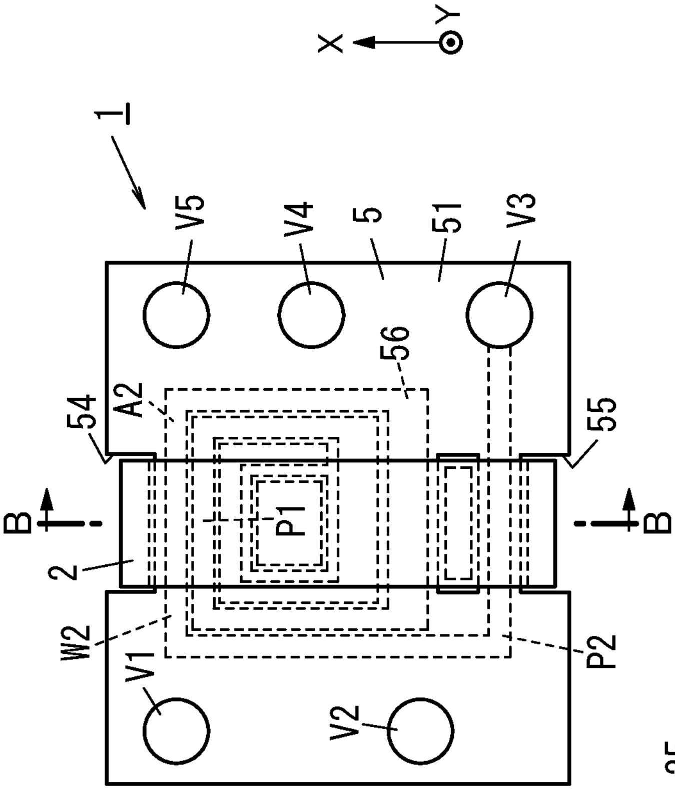
FIG. 8A is a plan view of the leakage transformer as viewed in one direction perpendicular to a direction in which the first magnetic leg and the second magnetic leg are arranged side by side.

As shown in FIGS. 7 and 8A, the leakage transformer 1 according to this embodiment includes a core 2 and a printed wiring board 5.

Figure 8B:
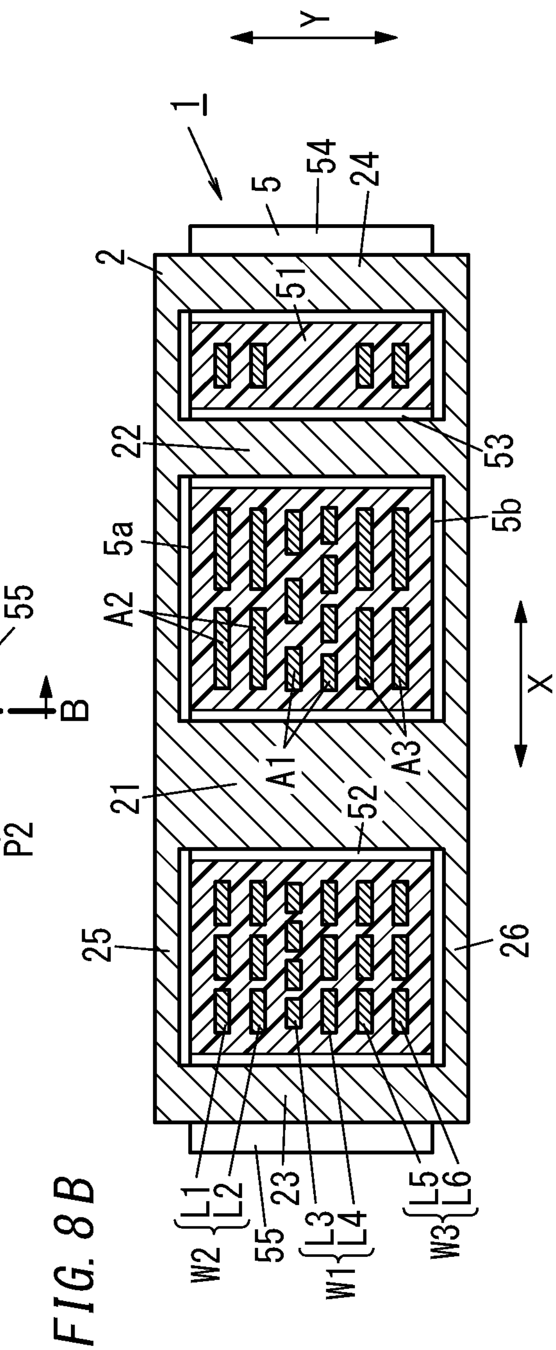
FIG. 8B is a cross-sectional view taken along the plane B-B of FIG. 8A.

As shown in FIG. 8B, the core 2 includes a first magnetic leg 21, a second magnetic leg 22, a third magnetic leg 23, a fourth magnetic leg 24, a first connection portion 25, and a second connection portion 26.

Figure 9:
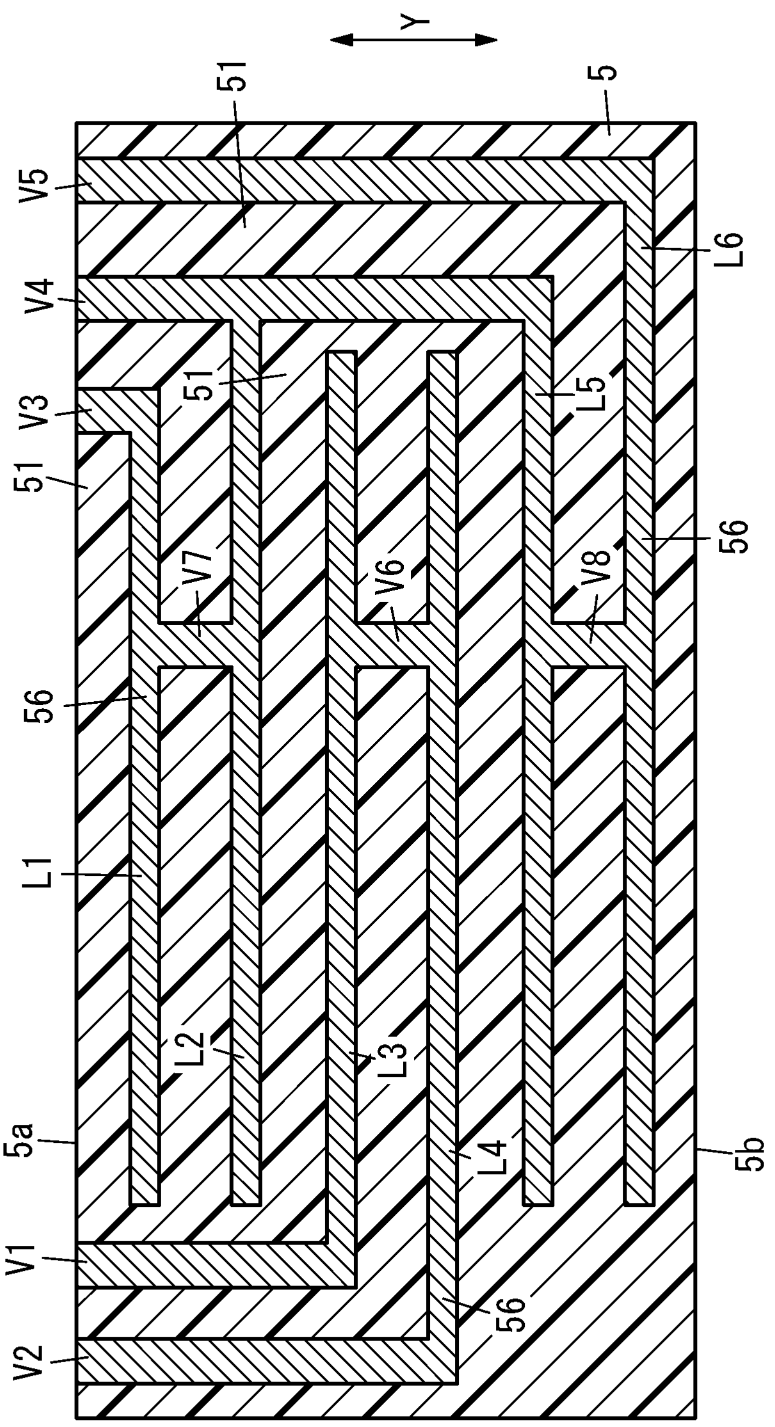
FIG. 9 illustrates the leakage transformer.
Figure 10C:
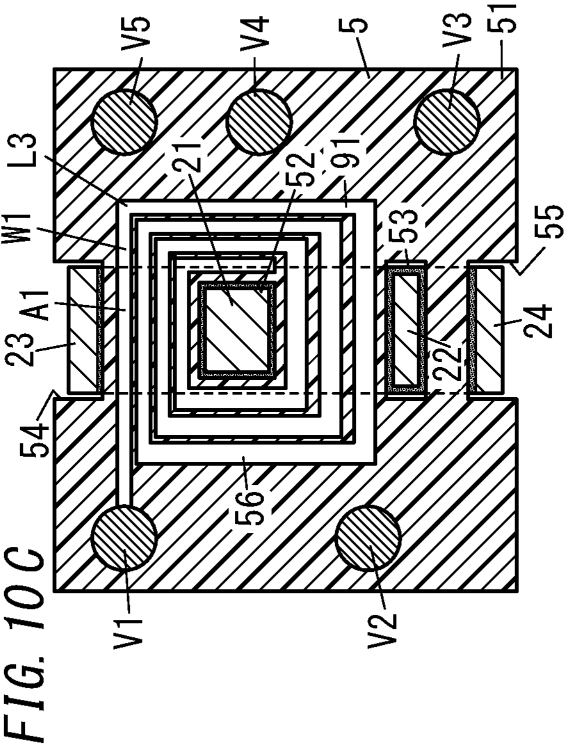
FIGS. 10A-10D illustrate the leakage transformer.
Figure 10D:
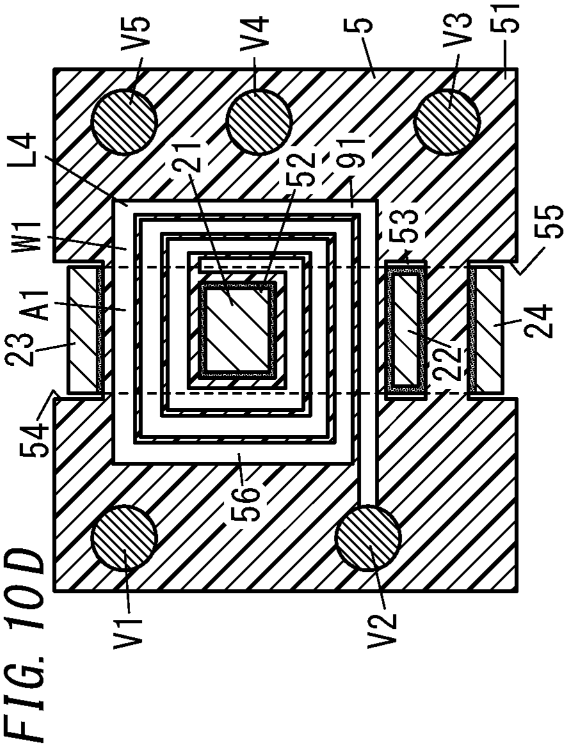
Figure 10A:
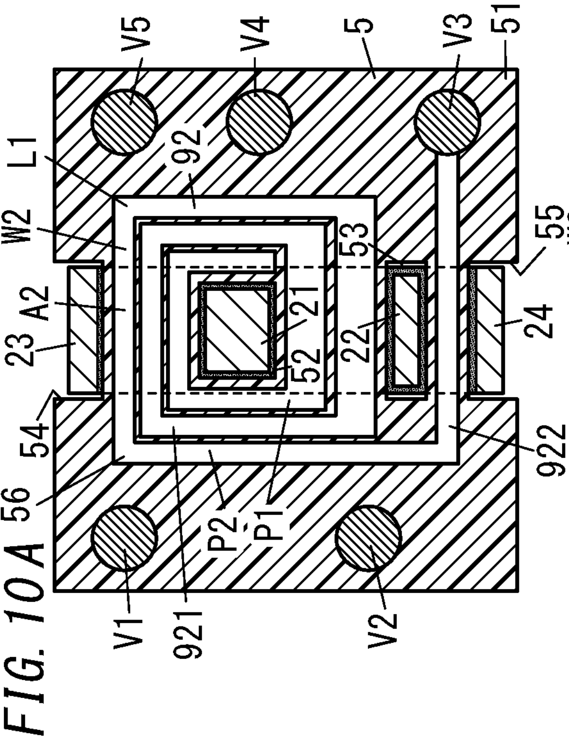
Figure 10B:
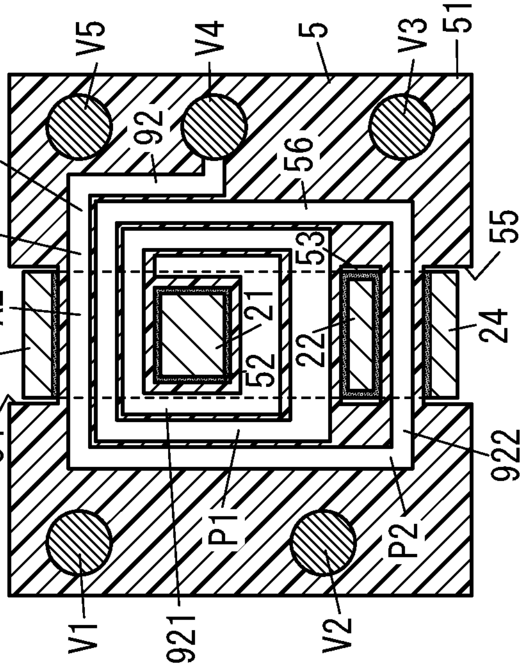

As shown in FIG. 8B, the printed wiring board 5 has a first through hole 52 and a second through hole 53. As shown in FIG. 9, the printed wiring board 5 further includes an insulating portion 51 and conductor wiring 56. Moreover, the printed wiring board 5 has a first surface 5*a* and a second surface 5*b* which are parallel to each other.

The conductor wiring 56 includes a plurality of wiring layers (namely, a first layer L1, a second layer L2, a third layer L3, a fourth layer L4, a fifth layer L5, and a sixth layer L6). The insulating portion 51 includes, for example, a plurality of insulating layers. In the printed wiring board 5, the wiring layers and the insulating layers may be alternately stacked one on top of another.

The conductor wiring 56 includes a first coil W1, a second coil W2, and a third coil W3. In the conductor wiring 56, each wiring layer includes at least one of a first wiring part 91 which forms at least a part of the first coil W1, a second wiring part 92 which forms at least a part of the second coil W2, or a third wiring part 93 which forms at least a part of the third coil W3 (see FIGS. 10A-11B).

Figure 11A:
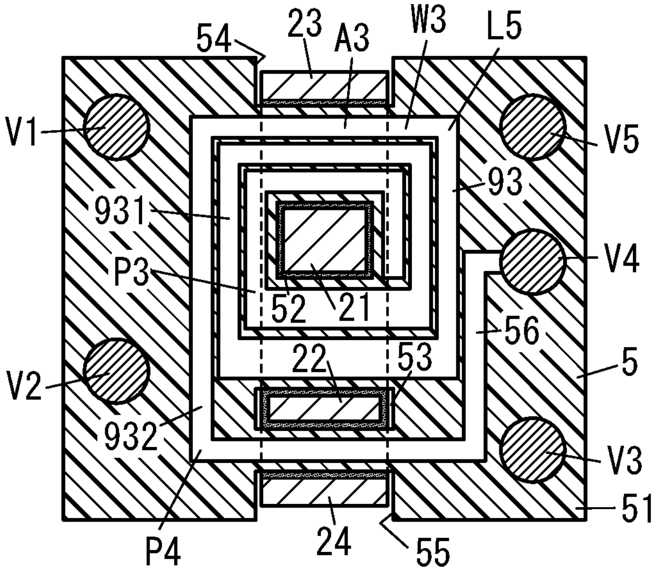
FIGS. 11A and 11B illustrate the leakage transformer.
Figure 11B:
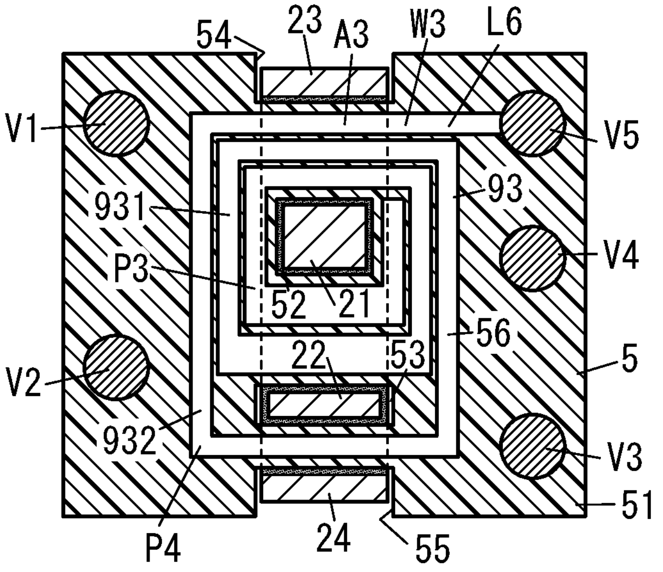

The third wiring part 93 includes at least one of a part 931 which forms at least a part of the third part P3 or a part 932 which forms at least a part of a fourth part P4 (see FIGS. 11A and 11B).

The part 931 is spirally formed so as to surround only the first through hole 52 out of the first and second through holes 52, 53.

The part 932 is spirally formed so as to surround both of the first and second through holes 52, 53 alike.

If the conductor wiring 56 includes a plurality of parts 931 and a plurality of parts 932, the third coil W3 is formed by electrically connecting the parts 931 through a via and electrically connecting the parts 932 through a via so that the parts 931 and the parts 932 are connected alternately. In that case, the via connecting the parts 931 together and the via connecting the parts 932 together are not provided at the same position in the insulating layer.

Next, the printed wiring board 5 according to this embodiment will be described in detail with reference to FIGS. 9-11B. FIG. 9 is a schematic representation of the printed wiring board 5 and does not show the core 2 to make the connection inside the printed wiring board 5 more easily understandable. Moreover, FIG. 9 is drawn such that a first via V1 and a second via V2 do not overlap with each other and that third to fifth vias V3, V4, V5 do not overlap with each other, either.

The conductor wiring 56 includes the first layer L1, the second layer L2, the third layer L3, the fourth layer L4, the fifth layer L5, and the sixth layer L6. The conductor wiring 56 further includes the first via V1, the second via V2, the third via V3, the fourth via V4, the fifth via V5, a via V6, a via V7, and a via V8.

The printed wiring board 5 as shown in FIG. 9 has a multilayer structure in which the first layer L1, the second layer L2, the third layer L3, the fourth layer L4, the fifth layer L5, and the sixth layer L6 are arranged in this order, in the Y direction, from the first surface 5*a* toward the second surface 5*b*. The first via V1 is connected to the first surface 5*a* and the third layer L3. The second via V2 is connected to the first surface 5*a* and the fourth layer L4. The third via V3 is connected to the first surface 5*a* and the first layer L1. The fourth via V4 is connected to the first surface 5*a*, the second layer L2, and the fifth layer L5. The fifth via V5 is connected to the first surface 5*a* and the sixth layer L6.

As shown in FIG. 9, the via V7 is connected to the first layer L1 and the second layer L2. The via V6 is connected to the third layer L3 and the fourth layer L4. The via V8 has electrical conductivity and is connected to the fifth layer L5 and the sixth layer L6.

The second coil W2 is formed by connecting the first layer L1 and the second layer L2 through the via V7. Note that in the example of the second coil W2 shown in FIGS. 10A and 10B, the winding direction of the second winding A2 is clockwise with respect to the third via V3, when the printed wiring board 5 is viewed in the Y direction from over the first connection portion 25.

Meanwhile, the first coil W1 is formed by connecting the third layer L3 and the fourth layer L4 through the via V6. Note that in the example of the first coil W1 shown in FIGS. 10C and 10D, the winding direction of the first winding A1 is counterclockwise with respect to the first via V1, when the printed wiring board 5 is viewed in the Y direction from over the first connection portion 25.

As shown in FIG. 11A, the fifth layer L5 is a layer including the third part P3 and the fourth part P4 which is connected to this third part P3 and the fourth via V4. The fifth layer L5 is formed of a third winding A3. The third part P3 of the fifth layer L5 is a part that is wound around the first magnetic leg 21 but not wound around the second magnetic leg 22. The fourth part P4 of the fifth layer L5 is a part wound around both the first magnetic leg 21 and the second magnetic leg 22. In the fifth layer L5, the third winding A3 of the fourth part P4 passes through the space between the fourth magnetic leg 24 and the second magnetic leg 22 but does not pass through the space between the first and second magnetic legs 21, 22.

As shown in FIG. 11B, the sixth layer L6 is a layer including the third part P3 and the fourth part P4 which is connected to this third part P3 and the fifth via V5. The sixth layer L6 is formed of a third winding A3. The third part P3 of the sixth layer L6 is a part that is wound around the first magnetic leg 21 but not wound around the second magnetic leg 22. The fourth part P4 of the sixth layer L6 is a part wound around both the first magnetic leg 21 and the second magnetic leg 22. In the sixth layer L6, the third winding A3 of the fourth part P4 passes through the space between the fourth magnetic leg 24 and the second magnetic leg 22 but does not pass through the space between the first and second magnetic legs 21, 22.

The third winding A3 may be formed out of a sheet of metal foil such as copper foil. Specifically, the third winding A3 is formed by performing an etching process on the sheet of metal foil to remove an unnecessary part thereof when each of the fifth layer L5 and the sixth layer L6 is formed.

The third coil W3 is formed by connecting the fifth layer L5 and the sixth layer L6 through the via V8.

In the fourth part P4 of the third coil W3, the third winding A3 does not pass through the space between the first and second magnetic legs 21, 22. This allows shortening the length of the third winding A3 used as the third coil W3. Therefore, the electrical resistance and power loss caused by the third coil W3 may be reduced.

Moreover, as shown in FIGS. 11A and 11B, the winding direction of the third winding A3 with respect to the third part P3 and the winding direction of the third winding A3 with respect to the fourth part P4 are the same. That is to say, when the third winding A3 is energized, an electric current flows through the third part P3 and the fourth part P4 in the same direction, when viewed along the axis of the third coil W3. For this reason, when the leakage transformer 1 is energized, the magnetic flux produced by the first magnetic leg 21 is canceled by the magnetic flux produced by the second magnetic leg 22, in the first and second connection portions 25, 26. This increases the chances of reducing the coupling coefficient between the second coil W2 and the third coil W3. As a result, leakage inductance tends to increase. Note that in the example of the third coil W3 shown in FIGS. 11A and 11B, the winding direction of the third winding A3 is clockwise with respect to the fourth via V4, when the printed wiring board 5 is viewed in the Y direction from over the first connection portion 25.

When the fifth layer L5 and the sixth layer L6 are connected through the via V8, the via V8 is provided between a tip portion, located most distant in the fifth layer L5 from the fourth via V4, of the third winding A3 and a tip portion, located most distant in the fourth layer L4 from the fifth via V5, of the third winding A3. Providing the via V8 at such a position reduces the chances of causing a decrease in the substantial number of turns of the third winding A3 in the third coil W3.

As described above, the printed wiring board 5 includes the insulating portion 51. As shown in FIG. 9, the insulating portion 51 covers the first to sixth layers L1, L2, L3, L4, L5, L6, the first to fifth vias V1, V2, V3, V4, V5, the via V6, the via V7, and the via V8. In particular, the insulating portion 51 is interposed between the second layer L2 and the third layer L3 and between the fourth layer L4 and the fifth layer L5. Therefore, the first and second layers L1, L2 are insulated from the third and fourth layers L3, L4 by the insulating portion 51. In addition, the third and fourth layers L3, L4 are insulated from the fifth and sixth layers L5, L6 by the insulating portion 51. Note that each of the first to fifth vias V1, V2, V3, V4, V5 may be partially exposed on the first surface 5*a*.

In this embodiment, the conductor wiring 56 includes the first to third coils W1, W2, W3, and therefore, the first to third coils W1, W2, W3 may each have its shape easily stabilized. This allows reducing, even when a great many leakage transformers 1 are manufactured, dispersion in leakage inductance between the individual products.

Figure 12:
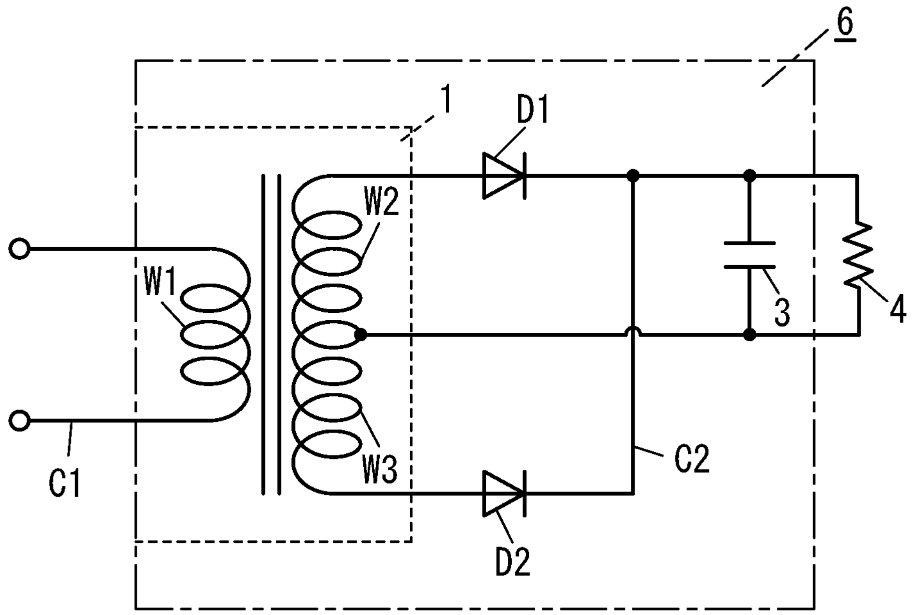
FIG. 12 is a circuit diagram of a circuit including the leakage transformer.

The leakage transformer 1 according to this embodiment may be connected, for example, as shown in FIG. 12.

A power supply circuit 6 as shown in FIG. 12 includes the leakage transformer 1, a first diode D1, a second diode D2 and a capacitor 3. In the power supply circuit 6 of this embodiment, a primary circuit C1 is connected to the first coil W1, and a secondary circuit C2 is connected to the second coil W2 and the third coil W3. Meanwhile, the secondary circuit C2 is electrically connected to a load 4.

(Variations)

In the embodiment described above, the core 2 includes, in addition to the first and second magnetic legs 21, 22, two magnetic legs (namely, third and fourth magnetic legs 23, 24) which are different from the first and second magnetic legs 21, 22. Meanwhile, in a variation, the core 2 may further include other magnetic legs in addition to the first to fourth magnetic legs 21, 22, 23, 24. That is to say, the core 2 may include, in addition to the first and second magnetic legs 21, 22, two or more magnetic legs which are different from the first and second magnetic legs 21, 22. Nevertheless, the additional magnetic legs other than the first and second magnetic legs 21, 22 preferably are only the third and fourth magnetic legs 23, 24. Even if the core 2 further includes magnetic legs other than the first to fourth magnetic legs 21, 22, 23, 24, the effect of reducing the external leakage of the magnetic flux would not be improved significantly. Rather, such a configuration would just cause an increase in the overall size of the core 2.

In the embodiment described above, the core 2 includes the first to fourth magnetic legs 21, 22, 23, 24. Alternatively, in another variation, the core 2 does not have to include the third and fourth magnetic legs 23, 24. In that case, the core 2 preferably has no gaps in neither of the first magnetic leg 21 nor the second magnetic leg 22.

In the first and second embodiments described above, the primary circuit C1 is connected to the first coil W1 and the secondary circuit C2 is connected to the second coil W2. On the other hand, in another variation, the primary circuit C1 may be connected to the second coil W2 and the secondary circuit C2 may be connected to the first coil W1.

(Recapitulation)

As can be seen from the foregoing description, a first aspect is implemented as a leakage transformer (1), which includes a core (2) and a printed wiring board (5). The core (2) includes a first magnetic leg (21) and a second magnetic leg (22). The second magnetic leg (22) is arranged to be spaced from the first magnetic leg (21). The printed wiring board (5) includes an insulating portion (51) and conductor wiring (56). The conductor wiring (56) includes a first coil (W1) and a second coil (W2). The first coil (W1) is formed of a first winding (A1). The first coil (W1) is wound around the first magnetic leg (21) but not wound around the second magnetic leg (22). The second coil (W2) is formed of a second winding (A2). The second coil (W2) includes a first part (P1) and a second part (P2). The first part (P1) is wound around the first magnetic leg (21) but not wound around the second magnetic leg (22). The second part (P2) is wound around both the first magnetic leg (21) and the second magnetic leg (22).

The first aspect allows a portion where the second winding (A2) passes through a space between the first magnetic leg (21) and the second magnetic leg (22) to be omitted from the second part (P2). Therefore, compared to a situation where the second winding (A2) is wound around each of the first magnetic leg (21) and the second magnetic leg (22), the length of the second winding (A2) used as the second coil (W2) may be shortened, and therefore, the electrical resistance and power loss of the second coil (W2) may be reduced. Moreover, according to the first aspect, the first coil (W1) and the second coil (W2) may each have its shape easily stabilized. This allows reducing, even when a great many leakage transformers (1) are manufactured, dispersion in leakage inductance between the individual products.

A second aspect is a specific implementation of the leakage transformer (1) according to the first aspect. In the second aspect, a winding direction of the second winding (A2) with respect to the first part (P1) and a winding direction of the second winding (A2) with respect to the second part (P2) are the same.

According to the second aspect, when the leakage transformer (1) is energized, the magnetic flux produced by the first magnetic leg (21) is canceled by the magnetic flux produced by the second magnetic leg (22). This increases the chances of reducing the coupling coefficient between the first and the second coils (W1, W2). As a result, leakage inductance tends to increase.

A third aspect is a specific implementation of the leakage transformer (1) according to the first or second aspect. In the third aspect, the core (2) further includes two or more other magnetic legs (23, 24) different from the first magnetic leg (21) and the second magnetic leg (22).

According to the third aspect, the magnetic flux which passes through the first magnetic leg (21) is induced to pass through the magnetic leg (23). Moreover, the magnetic flux which passes through the second magnetic leg (22) is induced to pass through the magnetic leg (24). This reduces the chances of allowing the magnetic flux generated in the leakage transformer (1) to leak out of the core (2). This allows noise generation to be reduced.

A fourth aspect is a specific implementation of the leakage transformer (1) according to the third aspect. In the fourth aspect, the core (2) has no gaps in any of the first magnetic leg (21), the second magnetic leg (22), or the two or more other magnetic legs (23, 24).

The fourth aspect reduces the chances of causing leakage of the magnetic flux out of the core (2). This allows noise generation to be reduced.

REFERENCE SIGNS LIST

1 Leakage Transformer
2 Core
21 First Magnetic Leg
22 Second Magnetic Leg
23 Magnetic Leg (Third Magnetic Leg)
24 Magnetic Leg (Fourth Magnetic Leg)
5 Printed Wiring Board
A1 First Winding
A2 Second Winding
P1 First Part
P2 Second Part
W1 First Coil
W2 Second Coil

The invention claimed is:

1. A leakage transformer comprising:
a core including a first magnetic leg and a second magnetic leg arranged to be spaced from the first magnetic leg; and
a printed wiring board including an insulating portion and conductor wiring, wherein:
the conductor wiring includes:
a first coil composed of a first winding, the first coil being wound around the first magnetic leg but not wound around the second magnetic leg; and
a second coil composed of a second winding,
the second coil includes:
a first part wound around the first magnetic leg but not wound around the second magnetic leg; and
a second part wound around both the first magnetic leg and the second magnetic leg,
the core further includes two or more other magnetic legs different from the first magnetic leg and the second magnetic leg,
the two or more other magnetic legs include:
a third magnetic leg adjacent to the first magnetic leg; and
a fourth magnetic leg adjacent to the second magnetic leg, and
no wire is fully wound around the third magnetic leg, and no wire is fully wound around the fourth magnetic leg.

2. The leakage transformer of claim 1, wherein the core has no gaps in any of the first magnetic leg, the second magnetic leg, or the two or more other magnetic legs.

3. The leakage transformer of claim 1, wherein a winding direction of the second winding with respect to the first part and a winding direction of the second winding with respect to the second part are the same.

4. The leakage transformer of claim 3, wherein the core has no gaps in any of the first magnetic leg, the second magnetic leg, or the two or more other magnetic legs.

5. A leakage transformer comprising:
a core including a first magnetic leg, a second magnetic leg, a third magnetic leg, a fourth magnetic leg, a first connection portion and a second connection portion, the first, second, third and fourth magnetic legs being disposed between the first and second connection portions and connected to the first and second connection portions, the first, second, third and fourth magnetic legs being arranged to be spaced from each other; and
a conductor wiring including a first coil and a second coil, wherein:
the first coil includes a first winding wound around the first magnetic leg but not wound around the second magnetic leg
the second coil includes a second winding,
the second coil includes:
a first part fully wound around the first magnetic leg but not wound around the second magnetic leg; and
a second part wound around both the first magnetic leg and the second magnetic leg, and
no wire is fully wound around the third magnetic leg, and no wire is fully wound around the fourth magnetic leg.

* * * * *